Aug. 22, 1950 W. J. GREUTMAN 2,519,832
WIRE STRETCHER
Filed Dec. 6, 1946
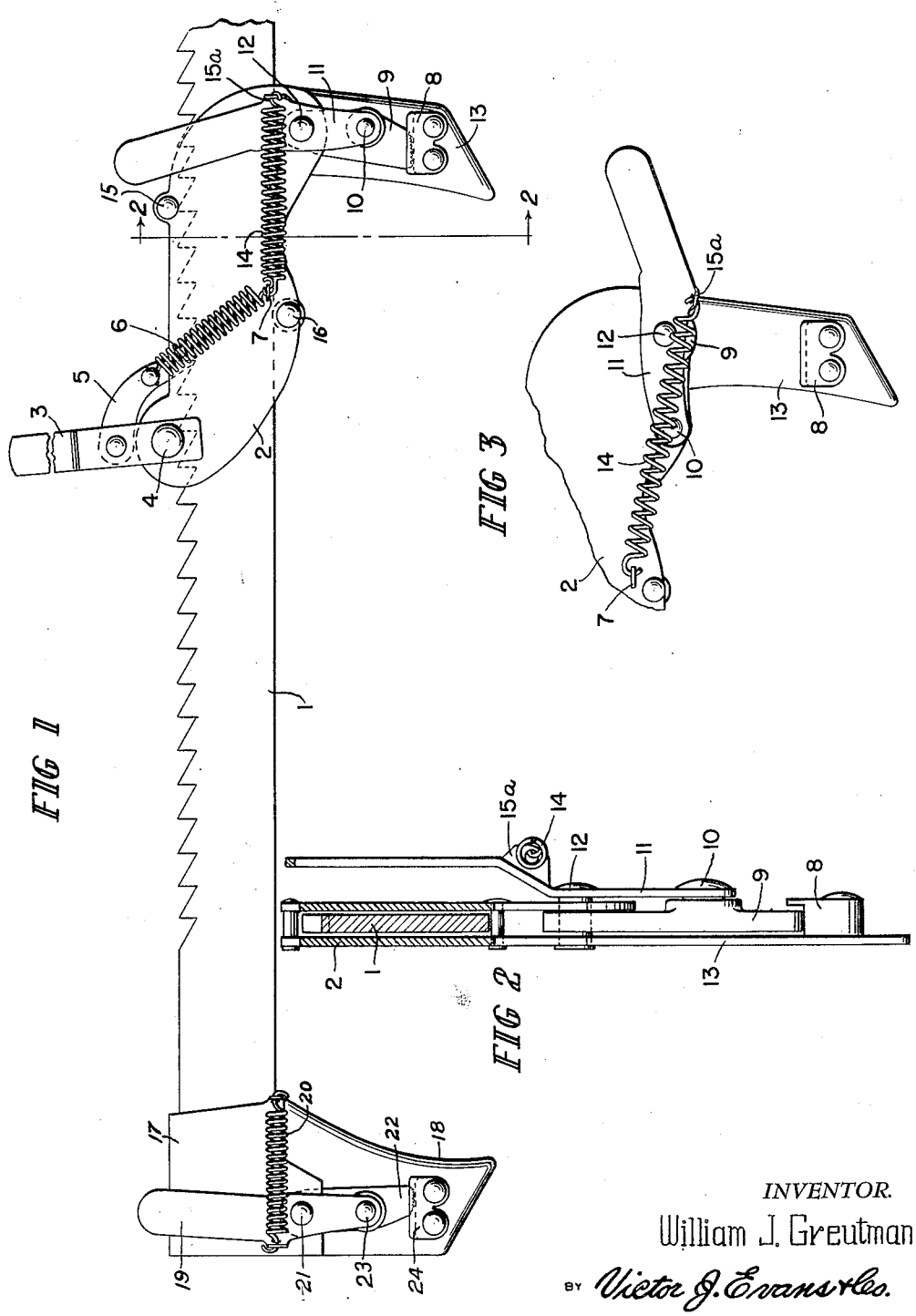
INVENTOR.
William J. Greutman
BY Victor J. Evans & Co.
ATTORNEYS Patented Aug. 22, 1950

2,519,832

UNITED STATES PATENT OFFICE 2,519,832

WIRE STRETCHER

William J. Greutman, Miller, Nebr.

Application December 6, 1946, Serial No. 714,377

3 Claims. (Cl. 254—71)

This invention relates to wire stretching devices, and more particularly to improvements in wire locking dogs used in such devices.

The locking dog herein described is an improvement of the structure disclosed in my prior Patent No. 1,792,535 issued February 17, 1931.

It is an object of the present invention to present a more simple wire holding means which can be more easily manipulated and enables manufacturing at less cost.

Another object of the invention is to provide improvements in a wire stretcher having a slider wherein the slider is provided with a holding pin positioned to coact with ratchet teeth in one side of a bar upon which the slider is positioned and a transversely disposed pin positioned to ride against the opposite side of the bar for urging the holding pin toward the teeth of the bar.

The further object of the invention is to provide a dog which can be easily removed for replacement when the teeth thereon become worn or otherwise ineffective.

These and other objects are attained by the novel construction and arrangement of parts hereinafter described and illustrated by the accompanying drawings, forming a part hereof, and in which:

Fig. 1 is a side elevational view of a wire stretcher embodying the invention.

Fig. 2 is a sectional view taken on the line 2—2 of Fig. 1.

Fig. 3 is a fragmentary view showing the locking dog removed and an operating lever in a position to release a dog.

Referring to the drawings, the device is shown to include a toothed bar 1, which is received in a yoke or slider 2 having pivoted thereto a lever 3 at 4; and pivotally connected to the lever is a pawl 5 adapted to engage the teeth of the bar 1. The pawl 5 is controlled by a spring 6 connected thereto and to the yoke 2 as shown at 7.

The yoke 2 has a depending leg 13 which has removably attached to its lower end a block 8 with a toothed surface adapted to engage the toothed lower end of a locking dog 9, which is connected by a pin 10 to the end of a lever 11 whereby the lever and doors are connected to each other for simultaneous rotation about the pivot 12, the dog 9 and the lever 11 being rotatably mounted on a pin 12 mounted on the yoke 2.

A spring 14 is connected at 7 to the yoke 2 and at 15a to the lever 11, the spring being an extension spring normally holding the lever 11 in a position to cause the dog 9 to engage the teeth on the block 8.

The wire stretcher, as described in my prior patent, can be used to stretch wire in both directions, the feature of the present invention lying in the arrangement of the locking dog and lever 11 and also in the position of the rivets 15 and 16 which extend transversely across the opposite edges of the bar with the rivet 15 providing a holding pin positioned to coact with the ratchet teeth of the bar and the rivet 16 providing a transversely disposed pin positioned to ride against the opposite edge of the bar for drawing the holding pin into the teeth of the bar.

The wire stretcher is also provided with a head 17 having a jaw 18 with a lever 19 resiliently held by a spring 20. The lever 19 is pivotally mounted on a pin 21 and the lower end is connected to a dog 22 by a pin 23 whereby the dog and lever are connected for simultaneous rotation about the pin 21. The jaw is also provided with a toothed block 24 similar to the block 8 and the block 24 is positioned to coact with the dog 22.

When the lever 11 is moved to the position shown in Fig. 3 the locking dog 9 will be released from engagement with the block 8. When it is desired to replace the dog 9 due to wear and the like, the pivot pin 12 is withdrawn to release the dog, and the pin 10 is withdrawn to completely free the dog. A new dog or a retoothed dog can be easily installed by mounting it on the pins 10 and 12.

The above structure obviously is simple and facilitates operations of the wire stretcher.

The above description is to be considered as illustrative and not limitative of the invention of which modifications can be made without departing from the spirit and scope as set forth in the appended claims.

The invention having been described, what is claimed is:

1. In a wire stretcher, the combination which comprises an elongated bar with ratchet teeth in the outer edge and having a stationary head on one end with an arcuate jaw extended therefrom and positioned on the side of the bar opposite to that in which the teeth are positioned, a slider slidably mounted on said bar and having a jaw fixedly mounted thereon, said jaw of the slider extended outwardly and positioned to coact with the jaw of the head, a pawl carried by the slider, means actuating the pawl to advance the position of the slider, clamping blocks carried by the outer ends of the jaws of the slider and head and positioned on the sides thereof, locking dogs on the sides of the head and slider, pins pivotally mounting the dogs on the slider and head with the dogs positioned to coact with the clamping blocks for gripping wires in the head and slider, levers pivotally mounted on the pins on which the dogs are pivotally mounted and connected to the said dogs for simultaneous rotation of the levers and dogs about the said pivotal mounting pins for actuating the dogs to releasing positions, springs connected to the said levers and slider and head, respectively, for urging the levers to the positions of urging the dogs in gripping relation with the clamping blocks, and means carried by the slider for coacting with the ratchet teeth to hold the slider as the pawl is advanced to engage another tooth.

2. In a wire stretcher, the combination which comprises an elongated bar with ratchet teeth in the outer edge and having a stationary head on one end with an arcuate jaw extended therefrom and positioned on the side of the bar opposite to that in which the teeth are positioned, a slider slidably mounted on said bar and having a jaw fixedly mounted thereon, said jaw of the slider extended outwardly and positioned to coact with the jaw of the head, a lever pivotally mounted on the inner end of the slider and extended therefrom, a pawl pivotally mounted on the lever and positioned to engage the ratchet teeth of the bar, a spring attached to the pawl and slider for resiliently holding the pawl in engagement with the ratchet teeth of the bar, clamping blocks carried by the outer ends of the jaws of the slider and head and positioned on the sides thereof, locking dogs on the sides of the head and slider, pins pivotally mounting the dogs on the slider and head with the dogs positioned to coact with the clamping blocks for gripping wires in the head and slider, levers pivotally mounted on the pins on which the dogs are pivotally mounted and connected to the said dogs for simultaneous rotation of the levers and dogs about the said pivotal mounting pins for actuating the dogs to releasing positions, springs connected to the said levers and slider and head, respectively, for urging the levers to the positions of urging the dogs in gripping relation with the clamping blocks, and means carried by the slider for coacting with the ratchet teeth to hold the slider as the pawl is advanced to engage another tooth.

3. In a wire stretcher, the combination which comprises an elongated bar with ratchet teeth in the outer edge and having a stationary head on one end with an arcuate jaw extended therefrom and positioned on the side of the bar opposite to that in which the teeth are positioned, a slider slidably mounted on said bar and having a jaw fixedly mounted thereon, said jaw of the slider extended outwardly and positioned to coact with the jaw of the head, a lever pivotally mounted on the inner end of the slider and extended therefrom, a pawl pivotally mounted on the lever and positioned to engage the ratchet teeth of the bar, a spring attached to the pawl and slider for resiliently holding the pawl in engagement with the ratchet teeth of the bar, clamping blocks carried by the outer ends of the jaws of the slider and head and positioned on the sides thereof, locking dogs on the sides of the head and slider, pins pivotally mounting the dogs on the slider and head with the dogs positioned to coact with the clamping blocks for gripping wires in the head and slider, levers pivotally mounted on the pins on which the dogs are pivotally mounted and connected to the said dogs for simultaneous rotation of the levers and dogs about the said pivotal mounting pins for actuating the dogs to releasing positions, springs connected to the said levers and slider and head, respectively, for urging the levers to the positions of urging the dogs in gripping relation with the clamping blocks, said lever pivotally mounted on the slider being mounted on a transversely disposed pin positioned to coact with the ratchet teeth of the bar, a holding pin spaced from the opposite end of the slider extended across the slider and positioned to coact with the ratchet teeth to hold the slider as the pawl is advanced, and a transversely disposed pin extended through the lower part of the slider and positioned to ride against the edge of the elongated bar opposite to that in which the ratchet teeth are positioned.

WILLIAM J. GREUTMAN.

REFERENCES CITED

The following references are of record in the file of this patent:

UNITED STATES PATENTS

| Number | Name | Date |
|---|---|---|
| 1,792,535 | Greutman | Feb. 17, 1931 |
| 1,794,512 | Cary | Mar. 3, 1931 |

FOREIGN PATENTS

| Number | Country | Date |
|---|---|---|
| 120,919 | Great Britain | Nov. 19, 1919 |